United States Patent
Sasaki (10) Patent No.: US 10,795,467 B2
(45) Date of Patent: Oct. 6, 2020

(54) DISPLAY DEVICE, ELECTRONIC BLACKBOARD SYSTEM, AND USER INTERFACE SETTING METHOD

(71) Applicant: NEC Display Solutions, Ltd., Tokyo (JP)

(72) Inventor: Yu Sasaki, Tokyo (JP)

(73) Assignee: NEC DISPLAY SOLUTIONS, LTD., Tokyo (JP)

(*) Notice: Subject to any disclaimer, the term of this patent is extended or adjusted under 35 U.S.C. 154(b) by 0 days.

(21) Appl. No.: 16/468,247

(22) PCT Filed: Dec. 14, 2016

(86) PCT No.: PCT/JP2016/087272
§ 371 (c)(1),
(2) Date: Jun. 10, 2019

(87) PCT Pub. No.: WO2018/109876
PCT Pub. Date: Jun. 21, 2018

(65) Prior Publication Data
US 2020/0081553 A1 Mar. 12, 2020

(51) Int. Cl.
*G06F 3/038* (2013.01)
*G06F 3/14* (2006.01)

(52) U.S. Cl.
CPC ............ *G06F 3/038* (2013.01); *G06F 3/1446* (2013.01)

(58) Field of Classification Search
None
See application file for complete search history.

(56) References Cited

U.S. PATENT DOCUMENTS

| 2015/0199166 A1* | 7/2015 | Eguchi | G06F 3/1454 345/2.2 |
| 2015/0279336 A1* | 10/2015 | Imai | G09G 5/14 345/634 |
| 2016/0147377 A1* | 5/2016 | Natori | G06F 3/0425 345/157 |

FOREIGN PATENT DOCUMENTS

| JP | 2000-222133 A | 8/2000 |
| JP | 2003-162370 A | 6/2003 |
| JP | 2013-130915 A | 7/2013 |
| JP | 2015-197781 A | 11/2015 |

OTHER PUBLICATIONS

International Search Report (ISR) (PCT Form PCT/ISA/210), in PCT/JP2016/087272, dated Mar. 21, 2017.

* cited by examiner

*Primary Examiner* — David D Davis
(74) *Attorney, Agent, or Firm* — McGinn IP Law Group, PLLC

(57) ABSTRACT

A display device is used in combination with a light-emitting device that emits first signal light. The display device has: a user interface unit that receives input operations using an indicator upon a display screen; and an imaging unit that captures images of the display screen and the first signal light. On the basis of captured images supplied from the imaging unit, the user interface unit takes a region of the display screen that is within a distance range that is determined in advance from the detected position of the first signal light as a valid operation region in which input operations using the indicator are valid.

7 Claims, 9 Drawing Sheets

| Color | Number of instances of light emission |
|---|---|
| Red | 1 |
| Blue | 2 |
| Yellow | 3 |
| ⋮ | ⋮ |

DISPLAY DEVICE, ELECTRONIC BLACKBOARD SYSTEM, AND USER INTERFACE SETTING METHOD

TECHNICAL FIELD

The present invention relates to a display device, an electronic blackboard system, a light-emitting device, a user interface setting method, and a program.

BACKGROUND ART

An electronic blackboard (also referred to as an interactive whiteboard) is provided that allows input operations to a display screen (whiteboard screen) by using an indicator such as a finger or an electronic pen. Such electronic blackboards include a display device type in which input operations are performed upon a display screen in which the display and touch panel are integrated and a projector type in which input operations are performed upon a projected image.

An electronic blackboard of the projector type includes an electronic pen, a camera device, a projector, and a computer device. The projector projects an image upon the whiteboard screen. The electronic pen is provided with a switch and a light emitter at the tip portion and is of a configuration such that the light emitter emits light as infrared rays in a state in which the switch is pressed. The user can press the switch to cause infrared rays to be emitted by pressing the tip of the electronic pen against the whiteboard screen.

The camera device takes the region that includes the whiteboard screen as the imaging range and captures an image of the infrared rays from the electronic pen. On the basis of the image signal from the camera device, the computer device recognizes the input operation that uses the electronic pen (such as a drawing, the deletion of a drawn picture, or clicking on an icon).

On the basis of the image signal from the camera device, the computer device generates a drawn picture signal that shows the track of the electronic pen and supplies the drawn picture signal to the projector. The projector projects the drawn picture on the basis of the drawn picture signal. As a result, a drawn picture that accords with the track of the electronic pen is displayed on the projected screen. The computer device can also be provided inside the projector.

On the other hand, in an electronic blackboard of the display type, the display device recognizes input operations that use an indicator on the basis of coordinate information that indicates the contact position of the indicator from the touch panel. In this case, a camera device is not necessary.

Electronic blackboard systems have also recently been provided that enable a plurality of users to use indicators to carry out input operations at the same time. In this electronic blackboard system, the display screen is partitioned into a plurality of operation regions and users carry out input operations using indicators for each operation region.

An application interface is provided in a display device (such as a projector or display). A user activates this application interface to cause display of the operation screen and is then able to use this operation screen to change the setting content of the operation region. For example, the number of operation regions or the assignment of the operation region to the screen can be changed, or the pen color or line thickness can be changed.

Figure 1:
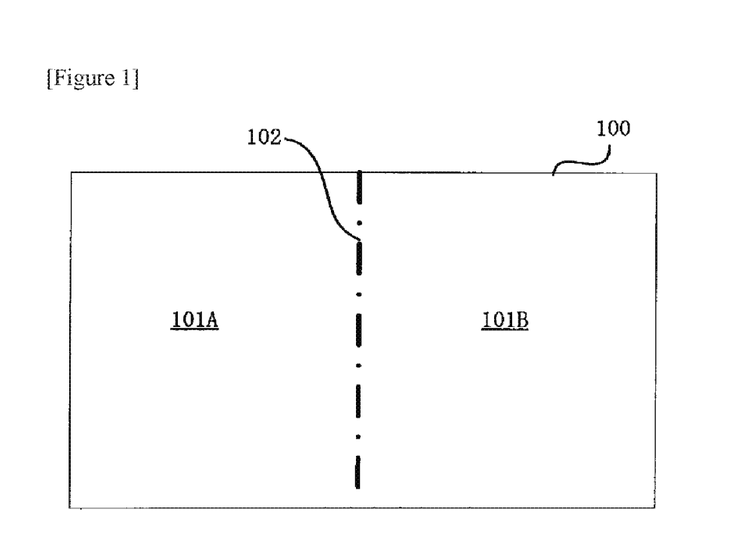
FIG. 1 is a schematic view that shows an example of the setting of valid operation regions when two users simultaneously perform drawing input using electronic pens.

FIG. 1 shows an example of the setting of the operation regions when two persons simultaneously use electronic pens to perform drawing input. In this example, display screen 100 is partitioned into two operation regions 101A and 101B, and partition line 102 that shows the border between operation region 101A and operation region 101B is displayed on display screen 100. The users are able to determine that the left region is operation region 101A and the right region is operation region 101B using partition line 102 as a reference. User A uses an electronic pen to perform drawing input to operation region 101A, and user B uses an electronic pen to perform drawing input to operation region 101B.

Profile information such as the color or line thickness of the pen is set in advance in each of operation regions 101A and 101B. For example, drawing input is performed by a red pen in operation region 101A, and drawing input is performed by a blue pen in operation region 101B.

Figure 2:
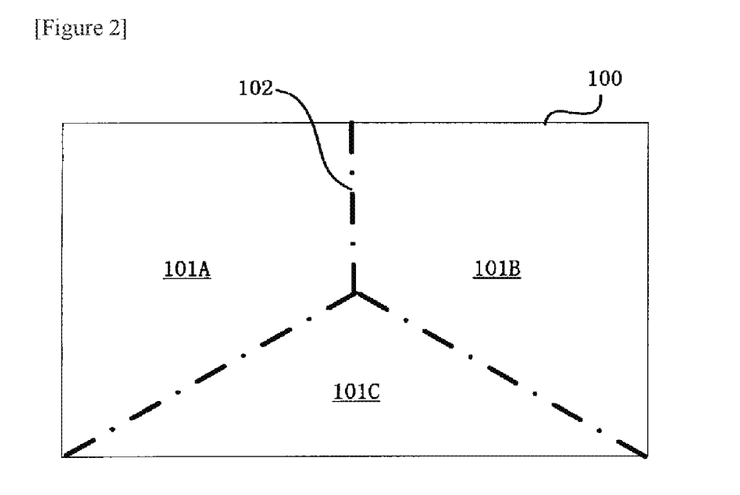
FIG. 2 is a schematic view showing an example of the setting of valid operation regions when three people simultaneously perform drawing input using electronic pens.

FIG. 2 shows an example of the setting of operation regions when three people use electronic pens to perform drawing input at the same time. In this example, display screen 100 is partitioned into three operation regions 101A, 101B and 101C, and partition lines 102 that indicate the borders of these operation regions 101A-101C are displayed on display screen 100. As in the example of FIG. 1, profile information is set in each of operation regions 101A-101C.

The users are able to distinguish the three operation regions 101A, 101B, and 101C on the basis of partition lines 102. User A uses an electronic pen to perform drawing input to operation region 101A, user B uses an electronic pen to perform drawing input to operation region 101B, and user C uses an electronic pen to perform drawing input to operation region 101C.

A pen-setting menu/dialog box for setting profile information can be displayed for each operation region. In this case, users are able to use an electronic pen to perform an opening/closing operation of the pen-setting menu/dialog box and can change the setting content.

Figure 3:
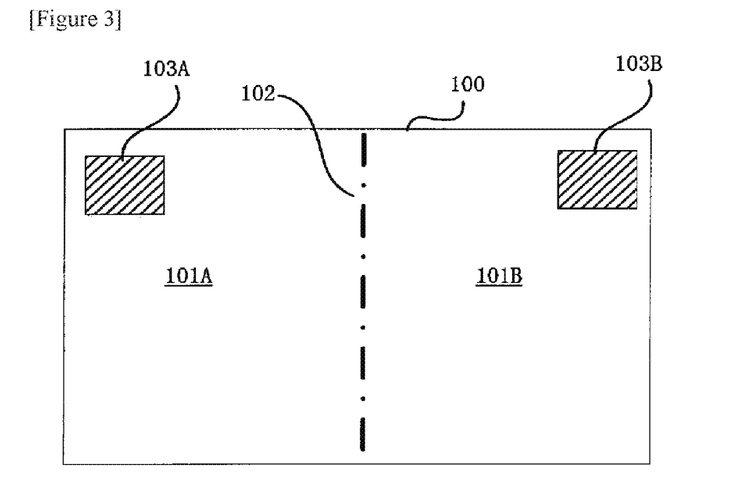
FIG. 3 is a schematic view showing an example of the floating type of a pen setting menu/dialog box.
Figure 4:
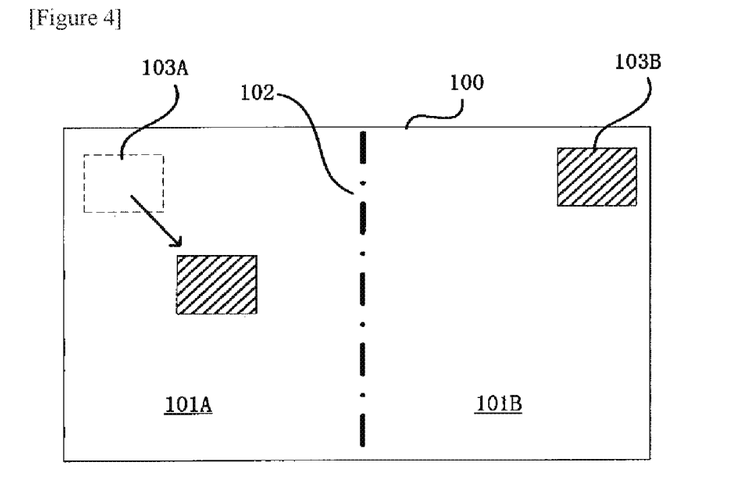
FIG. 4 is a schematic view for describing an example of the operation of the pen-setting menu/dialog box shown in FIG. 3.

FIG. 3 gives a schematic representation of an example of the floating type of pen-setting menu/dialog box. In this example, display screen 100 is partitioned into operation regions 101A and 101B, setting dialog box 103A is displayed in the upper left corner of operation region 101A, and setting dialog box 103B is displayed in the upper right corner of operation region 101B. The users are able to use electronic pens to perform operations upon setting dialog box 103A and setting dialog box 103B. For example, as shown in FIG. 4, a user can use an electronic pen to cause setting dialog box 103A to move to the center of operation region 101A.

As related art, Patent Document 1 discloses a technology for partitioning a display screen into a plurality of personal regions and receiving electronic pen input operations for each personal region.

LITERATURE OF THE PRIOR ART

Patent Documents

Patent Document 1: Japanese Unexamined Patent Application Publication No. 2000-222133

SUMMARY OF THE INVENTION

Problem to be Solved by the Invention

However, in an electronic blackboard system in which the above-described plurality of operation regions have been set, with each change of the number of persons that perform drawing input, the users must activate an application interface to cause display of an operation screen and carry out operations such as changing the number of valid operation regions or assigning the valid operation regions to the screen. These operations are extremely troublesome for users.

Further, there is the added inconvenience that input operations performed by the use of indicators cannot be carried out during the setting operations of the operation regions.

It is an object of the present invention to provide a display device, an electronic blackboard system, a light-emitting device, a user interface setting method, and a program that allow the simple setting of operation regions and thus solve the above-described problem.

Means for Carrying Out the Invention

According to an aspect of the present invention for achieving the above-described object, a display device is provided that is used in combination with a light-emitting device that emits a first signal light and that includes:

a user interface unit that receives input operations using an indicator upon a display screen that displays a video signal that is applied as input to the display device; and an imaging unit that captures images of the display screen and the first signal light;

wherein the user interface unit, on the basis of captured images that are supplied from the imaging unit, takes a region of the display screen that is within a distance range that has been determined in advance from the detected position of the first signal light as the valid operation region in which input operations that use the indicator are valid.

According to another aspect of the present invention, an electronic blackboard system is provided that includes:

the above-described display device; and a light-emitting device that emits the first signal light.

According to yet another aspect of the present invention, a light-emitting device is provided that is used in combination with a display device that is provided with a display screen and that receives input operations to the display screen using an indicator, the light-emitting device including:

an operation unit;

a light-emitting unit;

a control unit that receives input operation of a user by way of the operation unit and that controls the light-emitting operations of the light-emitting unit; and a data table that stores, for a plurality of setting items that make up profiles of valid operation regions in which input operations that use the indicator are valid, setting content and light-emission patterns in association for each setting item;

wherein the control unit refers to the data table, acquires a light emission pattern that corresponds to a setting item that a user selected from among the plurality of setting items, generates a command in which the light-emission pattern is combined with a predetermined light-emission pattern, and causes a command signal light that is based on the command to be emitted by the light-emitting unit.

According to yet another aspect of the present invention, a user interface setting method is provided that is carried out in a display device that is used in combination with a light-emitting device that emits a first signal light and that receives input operations using an indicator upon a display screen that displays a video signal that is applied as input to the display device, the method including:

using an image sensor to capture images of the display screen and the first signal light; and on the basis of captured images that are supplied from the image sensor, taking a region of the display screen that is within a predetermined distance range from the detected position of the first signal light as a valid operation region in which input operations using the indicator are valid.

According to yet another aspect of the present invention, a program is provided that causes a computer of a display device that is used in combination with a light-emitting device that emits a first signal light to execute processes of:

receiving input operations that use an indicator upon a display screen that displays a video signal that is applied as input to the display device;

using an image sensor to capture images of the display screen and the first signal light; and on the basis of captured images that are supplied from the image sensor, taking a region of the display screen that is within a distance range that is determined in advance from the detected position of the first signal light as a valid operation region for which input operations using the indicator are valid.

According to yet another aspect of the present invention, a program is provided that causes a computer of a light-emitting device that is used in combination with a display device that is provided with a display screen and that receives input operations using an indicator upon the display screen to execute processes of:

referring to a data table that stores, for a plurality of setting items that make up profiles of valid operation regions in which input operations that use the indicator are valid, setting content and light-emission patterns in association for each setting item and acquiring a light emission pattern that corresponds to a setting item that a user selected from among the plurality of setting items; and emitting a command signal light in which are combined the light emission pattern that was acquired and a predetermined light emission pattern.

Effect of the Invention

The present invention enables simple setting of valid operation regions and an improvement in convenience.

EXAMPLE EMBODIMENTS

Example embodiments of the present invention are next described with reference to the accompanying drawings.

First Example Embodiment

Figure 5:
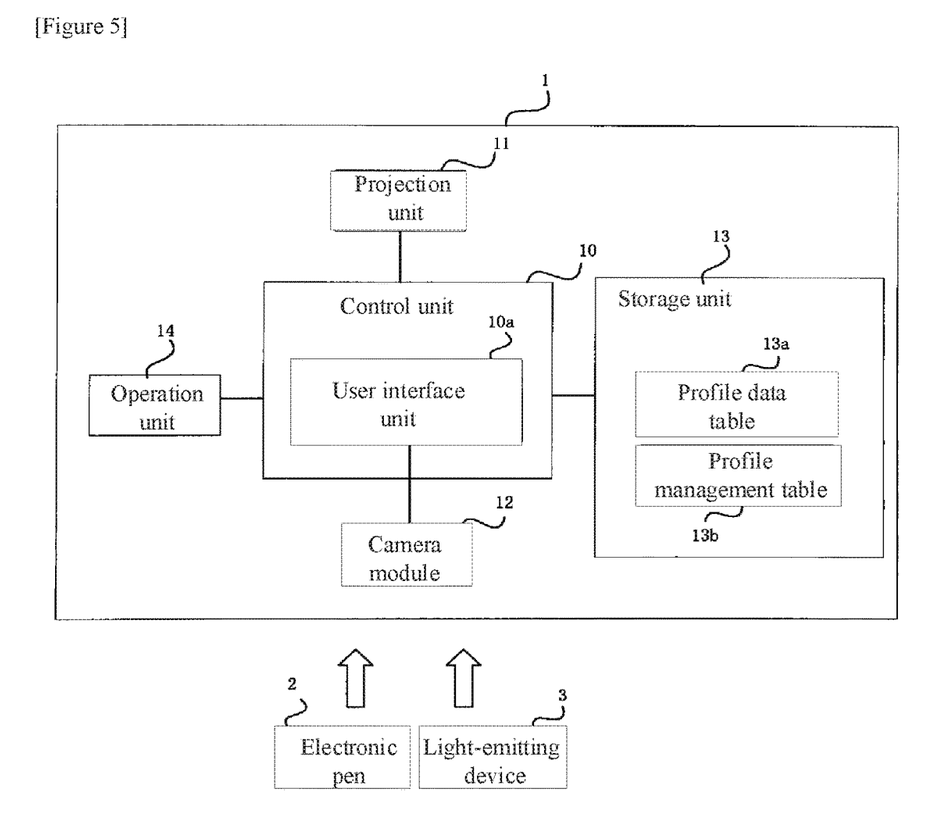
FIG. 5 is block diagram showing the configuration of the electronic blackboard system that is the first example embodiment of the present invention.

FIG. 5 is a block diagram showing the configuration of an electronic blackboard system that is the first example embodiment of the present invention.

Referring to FIG. 5, the electronic blackboard system is of the projector type and includes display device 1, electronic pen 2, and light-emitting device 3. Display device 1 can also be referred to as a projector.

Electronic pen 2 is provided with a switch and a light-emitting unit in the tip portion and is configured such that the light-emitting unit emits infrared light when the switch is in a pressed state. The user presses the switch and causes infrared light to be emitted by placing the tip of electronic pen 2 against the display screen (projection surface) of display device 1, and in this state, performs drawing input to the display screen. Electronic pen 2 can also be referred to as an indicator.

Light-emitting device 3 has the function of generating a command signal light for setting a valid operation region on the display screen of display device 1. The command signal light includes unique first light emission patterns (predetermined light emission patterns) that show the start and end of a command signal and second light emission patterns that show the content of the command signal (profile data of the valid operation region). A second light emission pattern is provided between a first light emission pattern that indicates the start and a first light emission pattern that indicates the end. The valid operation region shows the region (the valid region of the user interface) in which input operations using electronic pen 2 on the display screen are valid. The user is able to use light-emitting device 3 to designate a valid operation region. A device such as light and functional portable terminal as represented by, for example a smart phone can be used as light-emitting device 3.

Display device 1 includes control unit (CPU: Central Processing Unit) 10, projection unit 11, camera module 12, storage unit 13, and operation unit 14.

Operation unit 14 is provided with a plurality of operation keys, and the user can use these operation keys to operate display device 1 or enter necessary information. Projection unit 11 operates in accordance with control signals from control unit 10 and projects a display screen (hereinbelow referred to as a whiteboard screen) such as an input picture or drawn picture.

Camera module 12 is provided such that the imaging range contains the whiteboard screen and image light that contains the light emission wavelength of each of electronic pen 2 and light-emitting device 3. The light-emission wavelength of light-emitting device 3 and the light-emission wavelength of electronic pen 2 are set as appropriate according to design specifications. Electronic pen 2 supplies, for example, infrared light. The light-emission wavelength of light-emitting device 3 may be different from the light-emission wavelength of electric power 2. Light-emitting device 3 may emit visible light.

The captured images that are supplied from camera module 12 include an image that indicates the light emission pattern of electronic pen 2 and an image that indicates the light emission pattern of light-emitting device 3. An imaging element such as a CMOS (Complementary Metal-Oxide Semiconductor) image sensor or a CCD (Charge-Coupled Device) image sensor can be used for camera module 12. Camera module 12 can also be referred to as an imaging unit.

Storage unit 13 holds programs or data necessary for operating display device 1 and is constituted by a memory device such as semiconductor memory or a hard disk drive (HDD). For example, a user interface program and various data for executing processes related to the program are stored in storage unit 13.

Control unit 10 operates in accordance with a program that is stored in storage unit 13 and provides various functions (processes). Control unit 10 includes user interface unit 10a that is a function provided by a user interface program.

On the basis of an image signal that is supplied from camera module 12, user interface unit 10a receives input operations that use electronic pen 2 and receive setting instructions (command signals) of valid operation regions that use light-emitting device 3.

More specifically, on the basis of a captured image from camera module 12, user interface unit 10a detects an image that shows the light emission pattern of electronic pen 2. User interface unit 10a then recognizes the input operation to the whiteboard screen on the basis of the coordinates of the detected position of the light emission pattern of electronic pen 2. Here, the input operations include a drawn image, the deletion of a drawn picture, or clicking upon an icon.

In addition, user interface unit 10a, on the basis of a first light emission pattern, successively detects command signal light from a captured image that is supplied from camera module 12. User interface unit 10a then, for each command signal light, sets a valid operation region that indicates a region in which input operations that use electronic pen 2 are valid inside the whiteboard screen on the basis of the coordinates of the detected position of the first light emission pattern on the captured image. For example, a valid operation region is a region of the whiteboard screen that is within a predetermined distance range from the detected position of the first light emission pattern.

Still further, user interface unit 10a sets profile data that are acquired on the basis of a second light emission pattern that is included in the command signal light in the valid operation region.

Coordinate conversion information for converting the coordinate system of camera module 12 to the coordinate system of projection unit 11 is stored in storage unit 13. User interface unit 10a is able to refer to the coordinate conversion information and convert the detected position coordinates of the light emission pattern of electronic pen 2 or light-emitting device 3 in the captured image to the coordinate system of the whiteboard screen.

In addition, profile data table 13a in which profile data of valid operation regions and light emission patterns have been placed in correspondence is stored in storage unit 13. User interface unit 10a is able to refer to profile data table 13a, acquire profile data that correspond to second light emission pattern that is contained in the command signal light, and set the profile data to the valid operation region. The profile data include items such as the range (size) of the valid operation region, priority items, and items such as the color and thickness of the line drawn by an electronic pen.

Still further, profile management table 13b for managing the coordinate information of the valid operation regions and profile data are stored in storage unit 13. User interface unit 10a stores coordinate information and profile data for each valid operation region in profile management table 13b.

A user is able to use operation unit 14 to selectively delete data of a valid operation region that is stored in profile management table 13b. In this case, user interface unit 10a deletes information of the valid operation region that is designated by the user from profile management table 13b. Profile management table 13b is updated in accordance with the setting or deletion of the valid operation region.

Control unit 10 further controls the operation of projection unit 11 and camera module 12. Control unit 10 supplies a control signal to projection unit 11 for projecting an image of, for example, a whiteboard screen. For example, user interface unit 10a can generate an image such as an image of a whiteboard screen, an image that shows a valid operation region, or an image that shows the track of electronic pen 2, and as appropriate supplies projection unit 11 with an image signal that shows these images. Profile management table 13b is referred in the process of generating an image that shows a valid operation region. Profile management table is also referred in the drawing process of generating an image that shows the track of electronic pen 2.

Figure 6:
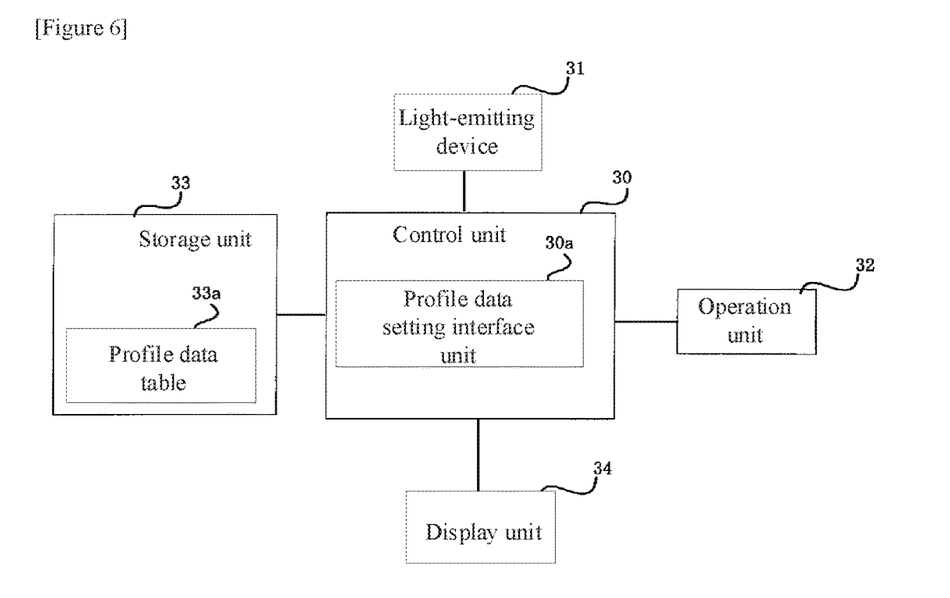
FIG. 6 is a block diagram showing the configuration of the light-emitting device of the electronic blackboard system shown in FIG. 5.

The configuration of light-emitting device 3 is next described in detail.

FIG. 6 is a block diagram showing the configuration of light-emitting device 3. Referring to FIG. 6, light-emitting device 3 has control unit (CPU) 30, light-emitting unit 31, operation unit 32, storage unit 33, and display unit 34. Display unit 34 is constituted by, for example, a liquid crystal display. Operation unit 32 is provided with a plurality of operation keys, and by using these operation keys, the user is able to operate light-emitting device 3 and enter necessary information. An input device such as a touch panel may be used as operation unit 32.

Storage unit 33 is constituted by, for example, a semiconductor memory and holds data and programs that are necessary for causing light-emitting device 3 to operate. For example, a program for a profile data setting interface or data for executing processing relating to the program are stored in storage unit 33. This program for a profile data setting interface and a program for the user interface of display device 1 are aligned and perform valid operation region setting processes that use the command signal light. Storage unit 33 stores profile data table 33a having the same content as profile data table 13a that is stored in storage unit 13 of display device 1.

Control unit 30 operates in accordance with programs that are stored in storage unit 33. Control unit 30 includes profile data setting interface unit 30a that is a function provided by the program for a profile data setting interface.

Profile data setting interface unit 30a executes a command signal generation process. In this command signal generation process, profile data setting interface unit 30a receives a profile data setting request by way of operation unit 32 and displays an operation screen that contains setting items of profile data table 33a on display unit 34. The user is able to designate desired profile data on the operation screen.

In addition, profile data setting interface unit 30a refers to profile data table 33a to acquire the light emission pattern that corresponds with the profile data designated by the user. Profile data setting interface unit 30a then controls the light-emitting operation of light-emitting unit 31 on the basis of a command in which the acquired light emission pattern (second light emission pattern) and a first light emission pattern that was set in advance are combined and causes the command signal light to be generated.

More specifically, profile data setting interface unit 30a, after causing light-emitting unit 31 to flash on and off at the first light emission pattern, causes light-emitting unit 31 to flash on and off at the acquired second light emission pattern, and finally causes light-emitting unit 31 to flash on and off at the first light emission pattern. In this way, a command signal light is generated that is made up from the first light emission pattern that indicates the start of the command signal, second light emission pattern that indicates the content of the command signal, and first light emission pattern that indicates the end of the command signal.

The first light emission pattern may be any light emission pattern as long as it can be recognized on the display device 1 side. For example, taking the shortest time interval that can be recognized by camera module 12 as the light emission time unit, the first light emission pattern may be a light emission pattern in which light is repeatedly emitted and extinguished at equal time spacing over a three-second interval.

Figure 7:
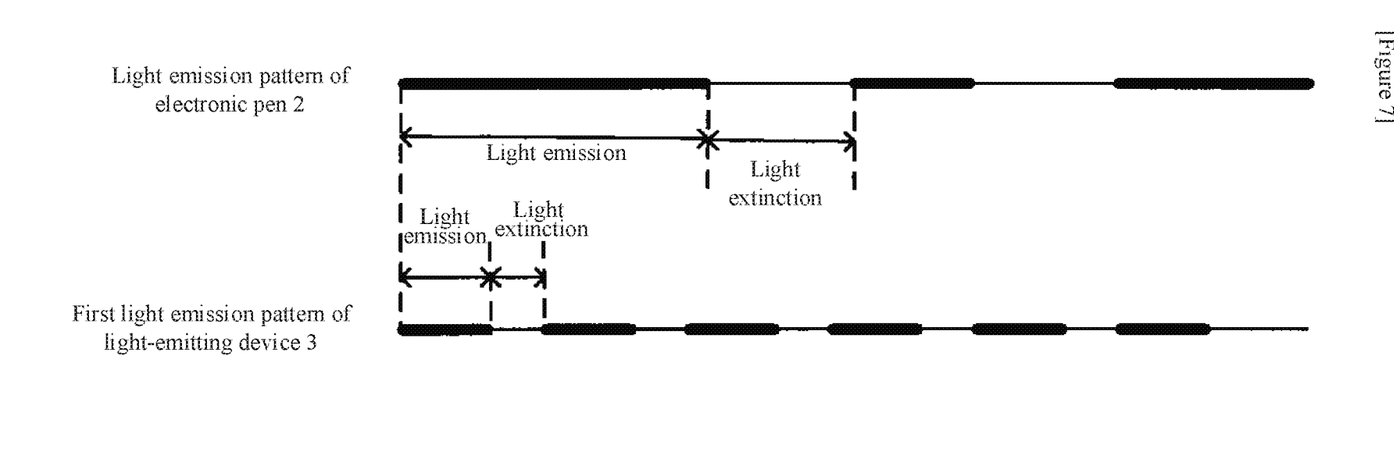
FIG. 7 is a view for describing an example of the light emission pattern of an electronic pen and the first light emission pattern of a light-emitting device.

FIG. 7 gives a schematic representation of the relation between the light emission pattern of electronic pen 2 during drawing and the first light emission pattern of light-emitting device 3. As can be seen from FIG. 7, in contrast with the light emission pattern of electronic pen 2 that has unequal spacing, the first light emission pattern of light-emitting device 3 has equal spacing and therefore has a unique light emission pattern that differs from the light emission pattern of electronic pen 2. As a result, the command signal light can be distinguished on the basis of the first light emission pattern.

In addition, the first light emission pattern is not limited to the pattern of equal time spacing shown in FIG. 7. For example, taking the shortest time interval that can be recognized by camera module 12 as the time unit of light emission, a light emission pattern in which light is repeatedly emitted and extinguished at equal time spacing over three seconds, then twice repeatedly emitted and extinguished each time for 0.5 seconds, and then continuously emitted for one second may be used as the first light emission pattern. In this way, the first light emission pattern can be more reliably distinguished.

A concrete example of the valid operation region setting operation of the above-described electronic blackboard system is next described.

The operation of generating the command signal light of light-emitting device 3 is first described.

Figure 8:
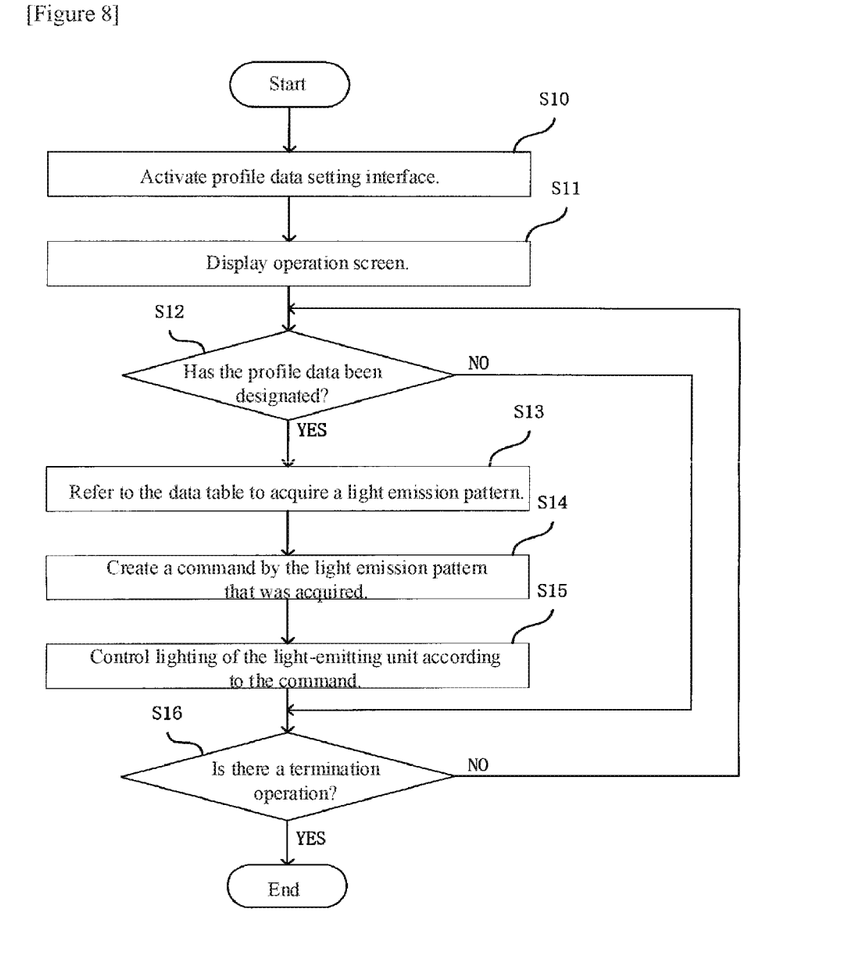
FIG. 8 is a flow chart showing the procedures of the command signal light generation process.

FIG. 8 is a flow chart showing the procedures of the command signal light generation process.

The user uses operation unit 32 to perform an input operation indicating the activation of the profile data setting interface, and in accordance with this input operation, control unit 30 then executes the program for the profile data setting interface (Step S10). In this way, profile data setting interface unit 301 is provided.

Profile data setting interface unit 30a next causes display unit 34 to display an operation screen that includes the setting items of profile data table 33a in accordance with a profile data setting request from the user (Step S11).

Profile data setting interface unit 30a then determines whether the designated operation of the profile data on the operation screen has been carried out (Step S12). If profile data have been designated, profile data setting interface unit 30a refers to profile data table 33a and acquires the light emission pattern that corresponds to the designated profile data (Step S13).

Profile data setting interface unit 30a next creates a command on the basis of the acquired light emission pattern (Step S14). Profile data setting interface unit 30a then performs lighting control of light-emitting unit 31 in accordance with the created command and generates the command signal light (Step S15).

After generating the command signal light, profile data setting interface unit 30a determines whether a completion operation indicating that the command signal light generation process has been completed has been carried out within a predetermined time interval (Step S16). If the completion operation has been carried out, profile data setting interface unit 30a completes the command signal light generation process. If the completion operation has not been carried out, profile data setting interface unit 30a executes the determination process of Step S12.

If the determination process of Step S12 is "NO," the determination process of Step S16 is carried out.

A more specific explanation of the operation of display device 1 is next presented.

Figure 9:
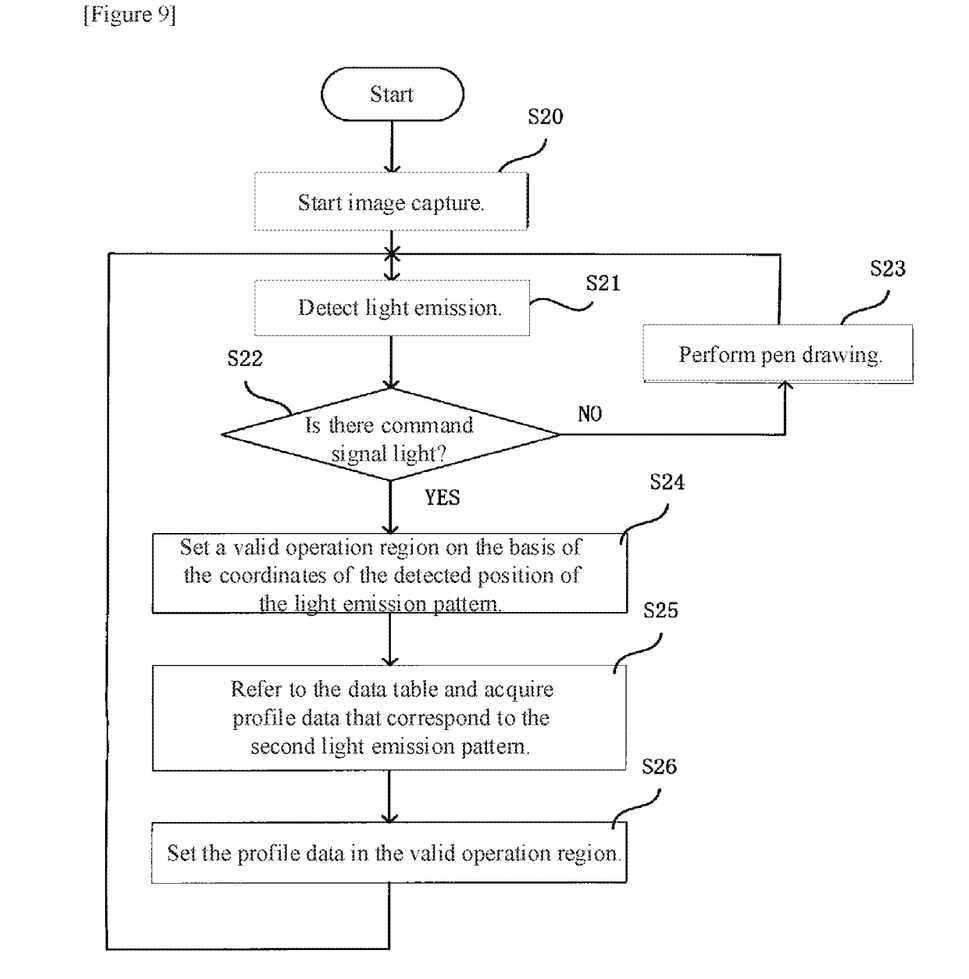
FIG. 9 is a flow chart showing the procedures of the valid operation region setting process that is based on command signal light.

FIG. 9 is a flow chart showing the procedures of the valid operation region setting process based on a command signal light. Here, projection unit 11 is already in the state of projecting a whiteboard screen.

User interface setting unit 10a first starts the image capture by camera module 12 (Step S20), and emitted light is detected on the basis of the captured images supplied from camera module 12 (Step S21).

User interface setting unit 10a next determines whether the emitted light that was detected is command signal light (Step S22). If the detected light is not command signal light, user interface setting unit 10a executes the normal pen drawing process (Step S23) and then executes the process of Step S21.

If the detected light is command signal light in Step S22, user interface setting unit 10a sets the valid operation region inside the whiteboard screen on the basis of the detected position coordinates of the light emission pattern on the captured image (Step S24).

User interface setting unit 10a then refers to profile data table 14a to acquire the profile data that correspond to the second light emission pattern that is contained in the command signal light (Step S25). User interface setting unit 10a then sets the profile data that were acquired to the valid operation region that was set in Step S24 (Step S26).

After Step S26, user interface setting unit 10a again executes the process of Step S21.

Next, as a more concrete example of the form of use, an example is described in which each of three users uses respective light-emitting device 3 to set valid operation regions and set the colors of different pens in each valid operation region.

Figure 10:
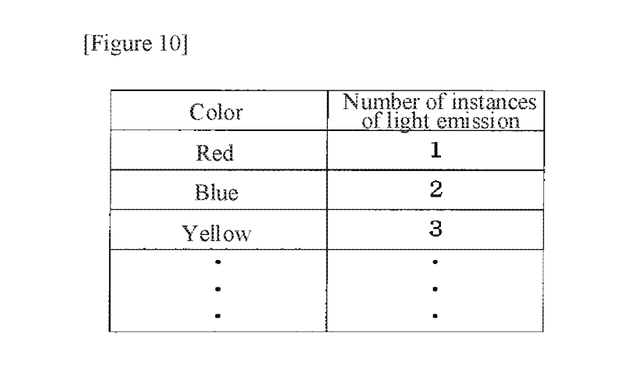
FIG. 10 is a view for describing a color table that is an example of a profile data table.

FIG. 10 shows a color table that is a shared profile data table in light-emitting device 3 and display device 1. This color table places the pen colors and the number of instances of light emission in association, and the number of instances of light emission is set for each pen color. For example, the number "1" of instances of light emission shows "red," the number "2" of instances of light emission shows "blue," and the number "3" of instances of light emission shows "yellow." This color table is stored in each of storage unit 13 of display device 1 and storage unit 33 of light-emitting device 3.

Figure 11A:
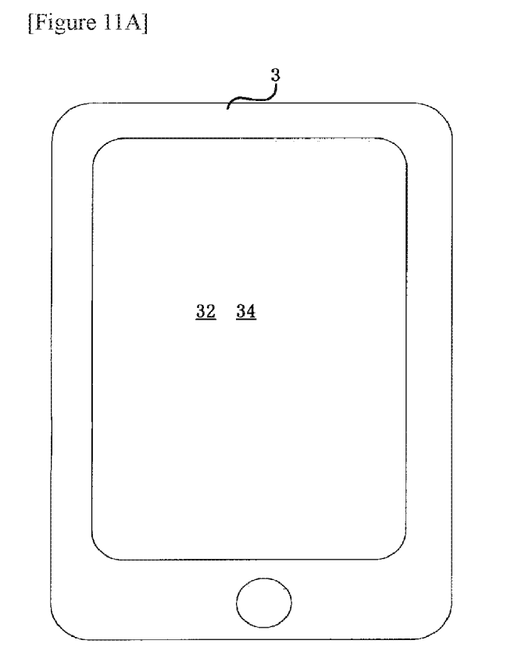
FIG. 11A is a schematic view showing the obverse side of a light-emitting device.
Figure 11B:
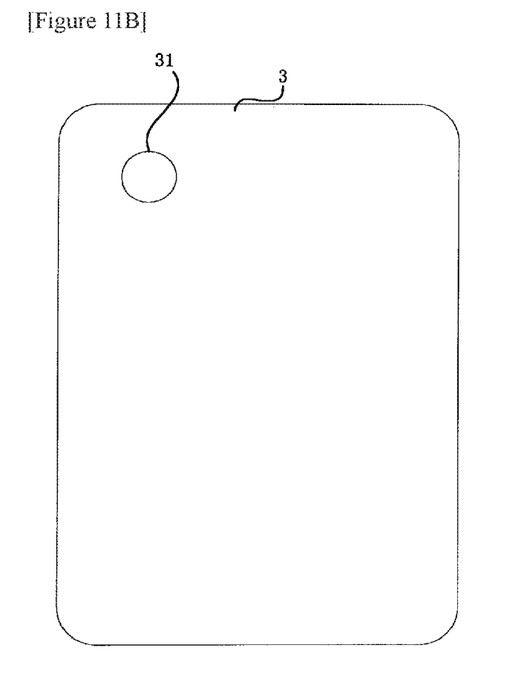
FIG. 11B is a schematic view showing the rear side of a light-emitting device.

FIG. 11A is a schematic view showing an example of the obverse side of light-emitting device 3, and FIG. 11B is a schematic view showing the rear side of light-emitting device 3. Light-emitting device 3 shown in FIGS. 11A and 11B is configured by using of a smart phone, operation unit 32 and display unit 34 being provided on the obverse side and light-emitting unit 31 being provided on the rear side.

A user uses light-emitting device 3 shown in FIGS. 11A and 11B to set a valid operation region on the whiteboard screen. Here, the three users A-C successively use light-emitting devices 3 to set valid operation regions on whiteboard screens.

Figure 12:
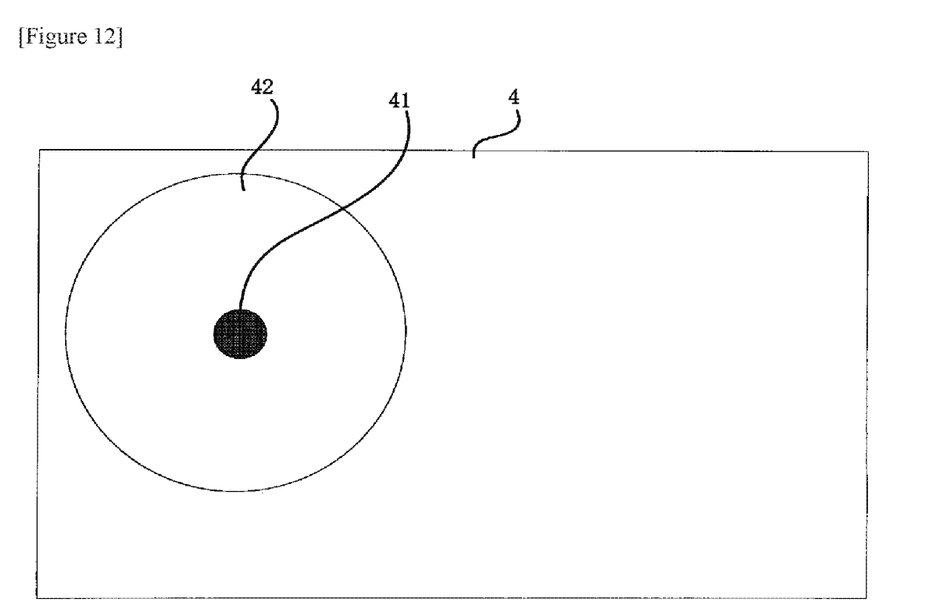
FIG. 12 is a schematic view showing an example of a valid operation region that is set on a whiteboard screen.

User A first arranges light-emitting device 3 on the left-side region of the whiteboard screen and causes generation of command signal light that contains the second light emission pattern that indicates a number "1" of instances of light emission. As shown in FIG. 12, in this case, a light emission pattern is detected in the left-side region of whiteboard screen 4 and circular valid operation region 42 is set that takes the detected point 41 of the light emission pattern as center. When user A performs an input operation using electronic pen 2 inside valid operation region 42, a "red" drawn image that accords with the input operation is displayed in valid operation region 42.

Figure 13:
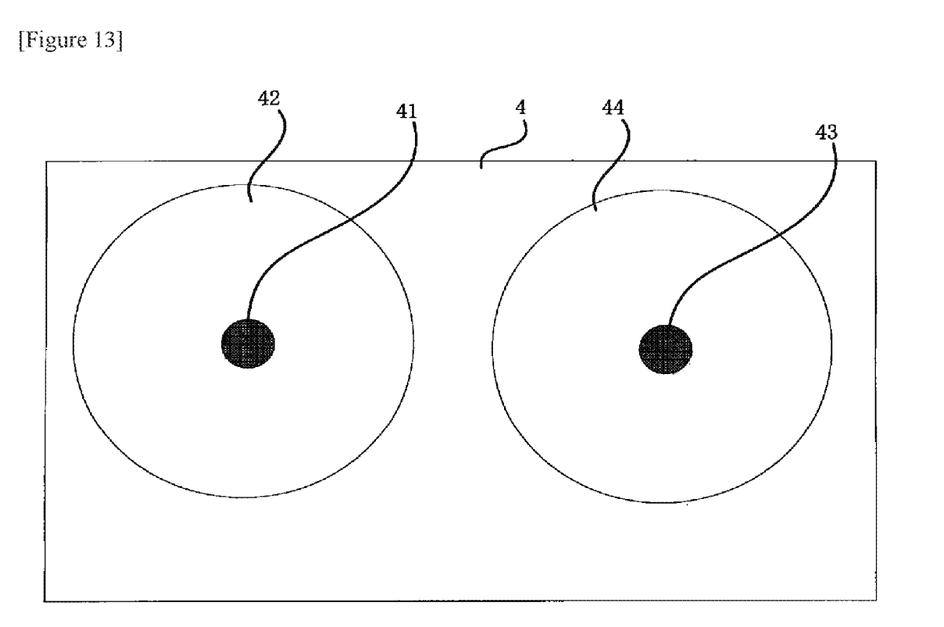
FIG. 13 is a schematic view showing another example of valid operation regions that are set on a whiteboard screen.

Next, user B arranges light-emitting device 3 in the right-side region of the whiteboard screen and causes generation of a command signal light that contains a second light emission pattern that indicates a number "2" of instances of light emission. In this case, the light emission pattern is detected in the right-side region of whiteboard screen 4 and circular valid operation region 44 that takes the detected point 43 of the light emission pattern as center is set as shown in FIG. 13. When user B performs an input operation using electronic pen 2 inside valid operation region 44, a "blue" drawn image that accords with the input operation is displayed in valid operation region 44.

Figure 14:
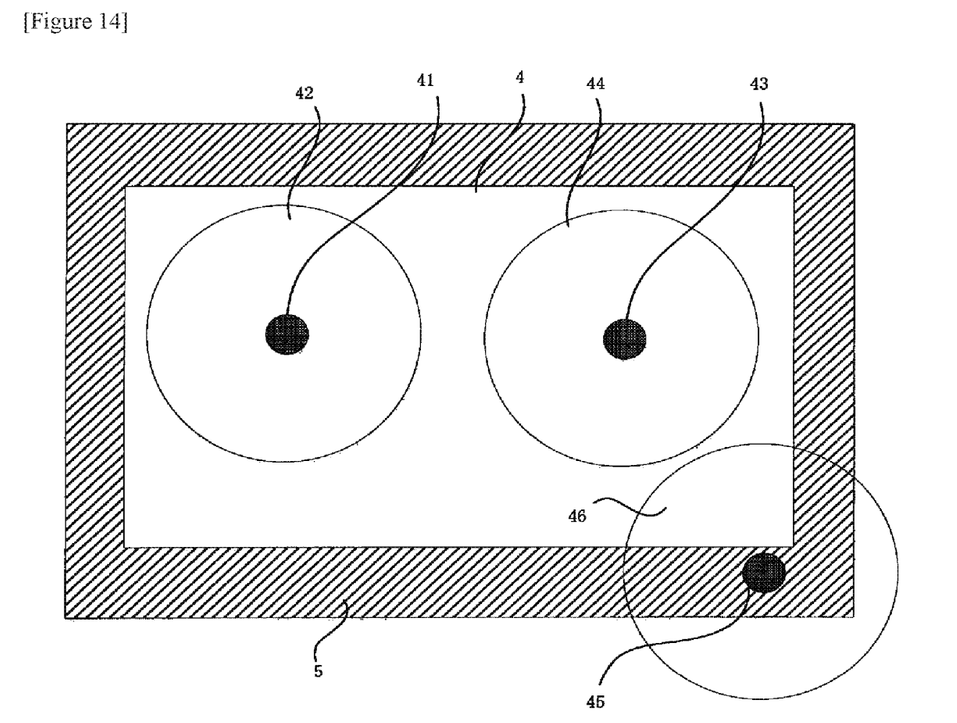
FIG. 14 is a schematic view showing yet another example of valid operation regions that are set on a whiteboard screen.

Finally, user C arranges light-emitting device 3 in the lower right region (within the range of image capture) outside the whiteboard screen and causes the generation of command signal light that contains a second light emission pattern that indicates a number "3" of instances of light emission. In this case, a light emission pattern is detected in the lower right region (within the range of image capture 5) outside the whiteboard screen, and of the circular region that takes detected point of light emission 45 as center, a fan-shaped region on whiteboard screen 4 is set as valid operation region 46, as shown in FIG. 14. When user C performs an input operation using electronic pen 2 inside valid operation region 46, a "green" drawn image that accords with the input operation is displayed in valid operation region 46.

Although light-emitting devices 3 have been provided for each user, one light-emitting device 3 may also be provided for a plurality of users.

According to the electronic blackboard system of the present example embodiment as described above, a user is able to set a valid operation region at any position on a whiteboard screen by merely operating light-emitting device 3 at that position to cause generation of command signal light. In this way, a valid operation region can be set by an operation that is both simple and intuitive using light-emitting device 3. The setting operation of a valid operation region using this light-emitting device 3 does not interfere with the drawing input operations of other valid operation regions.

In addition, the electronic blackboard system of the present example embodiment further exhibits the following action and effects.

When a setting dialog box such as shown in FIG. 3 is displayed in a valid operation region, the setting dialog box may become an obstruction when drawing input is performed by using an indicator. Drawing input is enabled by moving the setting dialog box as shown in FIG. 4. However, the operation of moving the setting dialog box is an operation having no relation to the original drawing input operation. Thus, when performing drawing input in this way, performing the moving operation that has no relation to the drawing input operation detracts from convenience.

According to the electronic blackboard system of the present example embodiment, in contrast, the profile data of a valid operation region can be set by using light-emitting device 3 and there is consequently no need to display the setting dialog box.

Alternatively, a form can also be considered in which a communication system, in which an outside device and projector are connected by way of a wireless network, is applied to the electronic blackboard system and the outside device is then used to set the valid operation regions. In this case, however, the connection settings that are required for the wireless network entail some time and effort.

In contrast, in the electronic blackboard system of the present example embodiment, display device 1 receives command signal light directly from light-emitting device 3 without the interposition of a wireless network. As a result, connection settings for the network need not be carried out.

The electronic blackboard system of the present example embodiment described above is only an example of the present invention, and the configuration and operation are open to appropriate modifications within a scope that will be clear to one of ordinary skill in the art.

For example, display device 1 can be made a display type in which the display is integrated with a touch panel and input operations are performed on the display screen. In this case, the configuration shown in FIG. 5 uses a display unit that is provided with a display screen in which a display and a touch panel are integrated in place of projection unit 11. An implement lacking a light emission capability, such as a finger, can be used as the indicator.

In the electronic blackboard system of the present example embodiment, profile data setting interface unit 30a may cause light-emitting unit 31 to generate a command signal light for deleting a valid operation region. This command signal light for deletion includes a unique light emission pattern that differs from the first light emission pattern. In display device 1, user interface unit 10a detects the command signal light for deletion from a captured image and deletes the data of the valid operation region from profile management table 13b. For example, user interface unit 10a may, upon detecting the command signal light for deletion, delete all of the data of the valid operation region that is stored in profile management table 13b. Alternatively, user interface unit 10a, upon detecting the command signal light for deletion, may also acquire the detected position coordinates of the light emission pattern, determine from among valid operation regions that are stored in profile management table 13b the valid operation region that is closest to the detected position coordinates that were acquired, and delete the data of that valid operation region from profile management table 13b.

Further, when at least a portion of valid operation regions that have been set for each command signal light overlap each other, user interface unit 10a may give priority to the valid operation region for which the order of detection of the command signal light was late or early.

Still further, the size, shape, or priority of valid operation regions may also be set as the profile data of valid operation regions. When the priority has been set and when at least a portion of valid operation regions that have been set for each command signal light overlap with each other, user interface unit 10a gives priority to the valid operation region having the higher priority.

Still further, in the electronic blackboard system of the present example embodiment, a detection module can be used that detects drawing input onto a whiteboard screen using an indicator that lacks a light-emitting capability. For example, the detection module is provided with at least one laser light source that is arranged such that the optical axis is parallel to the whiteboard screen. The light from the laser light source forms a curtain-shaped detection plane that faces the whiteboard screen. When a desired position of the whiteboard screen is indicated by an indicator such as a finger, the laser light is reflected or scattered by a portion of the indicator at the curtain-shaped detection surface. Camera module 12 is able to detect the position of the indicator on the whiteboard screen by detecting the reflected light or scattered light of laser light from the portion of the indicator.

Further, programs such as a program for the user interface or a program for the profile data setting interface may be provided by a recording medium or may be provided by way of a network such as the Internet. The recording medium is a computer-usable medium or a computer-readable medium and may include media that allow information to be recorded or read through the use of, for example, magnetism, light, electrons, electromagnetism, or infrared rays. Examples of such media include semiconductor memory, semiconductor or solid memory devices, magnetic tapes, removable computer diskettes, random access memory (RAM), read-only memory (ROM), magnetic disks, optical disks, and magneto-optic disks.

Second Example Embodiment

Figure 15:
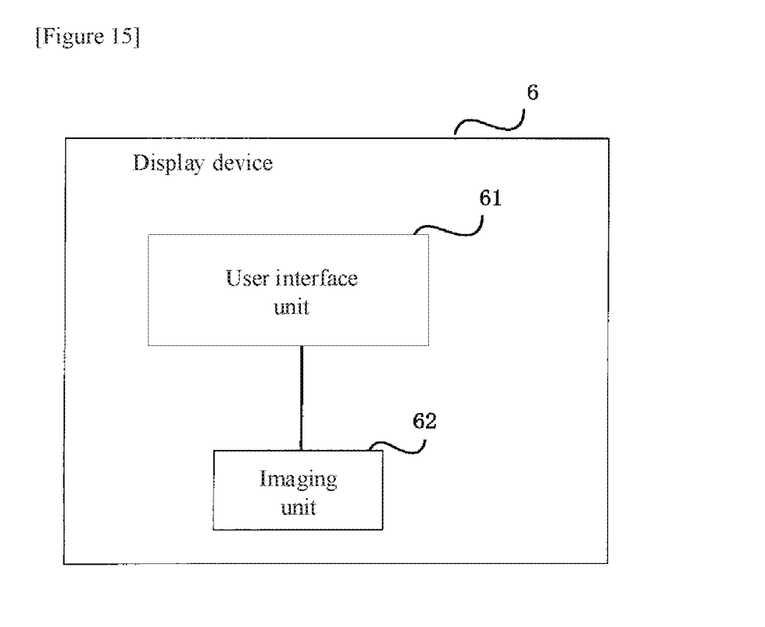
FIG. 15 is a block diagram showing the configuration of a display device that is the second example embodiment of the present invention.

FIG. 15 is a block diagram showing the configuration of a display device that is the second example embodiment of the present invention.

Display device 6 shown in FIG. 15 is a device used in combination with a light-emitting device that emits first signal light (command signal light) and includes user interface unit 61 and imaging unit 62.

User interface unit 61 receives input operations that use an indicator upon the display screen. Imaging unit 62 captures images of the display screen and the first signal light. On the basis of the captured image that is supplied from imaging unit 62, user interface unit 61 takes, as the valid operation region in which input operations that use an indicator are valid, a region of the display screen that is within a predetermined distance range from the detected position of first signal light.

According to the display device of the present example embodiment, a valid operation region can be easily set, and an improvement in convenience can be achieved.

In the display device of the present example embodiment, first signal light contains a light emission pattern that indicates profile information of the valid operation region, and user interface unit 61 may acquire profile information on the basis of the light emission pattern and set this profile information to the valid operation region.

Further, profile information is composed of a plurality of setting items, and a data table is further included that stores the setting content and light emission pattern in association for each setting item. User interface unit 61 may also refer to the data table to acquire setting content that corresponds to the light emission pattern that is contained in the first signal light.

The plurality of setting items includes setting items that indicate the priority of valid operation regions, and user interface unit 61 may successively detect first signal light from captured images and set a valid operation region for each first signal light. In this case, user interface unit 61 may give priority to valid operation regions having higher priority when at least a portion of valid operation regions that are set to each first signal light overlap with each other.

Still further, user interface unit 61 may give priority to valid operation region for which the order of detection of first signal light is later or earlier when at least a portion of valid operation regions that are set for each first signal light overlap with each other.

A projection unit that projects an image may further be included. In this case, the display screen may be a screen that is projected from the projection unit.

The present invention as described hereinabove can be applied to display devices in general that are provided with interactive boards. In a display device in which an interactive board is not mounted, moreover, as long as a light emission detection module is mounted, the application of the present invention allows user information to be transmitted without passing by way of the Internet. In this way, the present invention can be used for advertising display that accords with, for example, the age of users. The present invention can also be applied to systems that use remote controllers or network applications.

The present invention can adopt, but is not limited to, forms such as shown in the following Supplementary Notes 1 to 13.

[Supplementary Note 1]

A display device that is used in combination with a light-emitting device that emits a first signal light includes:

a user interface unit that receives input operations that use an indicator upon a display screen that displays a video signal that is applied as input to the display device; and an imaging unit that captures images of the display screen and the first signal light;

wherein the user interface unit, on the basis of captured images that are supplied from the imaging unit, takes a region of the display screen that is within a distance range that has been determined in advance from the detected position of the first signal light as a valid operation region in which input operations that use the indicator are valid.

[Supplementary Note 2]

In the display device as described in Supplementary Note 1, the first signal light contains a light emission pattern that indicates profile information of the valid operation region, and the user interface unit acquires the profile information on the basis of the light emission pattern and sets this profile information to the valid operation region.

[Supplementary Note 3]

In the display device described in Supplementary Note 2:

the profile information is made up from a plurality of setting items;

the display device further includes a data table that stores setting content and a light emission pattern in association for each of the setting items; and the user interface unit refers to the data table to acquire setting content that corresponds to the light emission pattern contained in the first signal light.

[Supplementary Note 4]

In the display device as described in Supplementary Note 3:

the plurality of setting items include setting items that indicate the priority of the valid operation regions; and the user interface unit successively detects the first signal light from captured images that are supplied from the imaging unit, sets the valid operation regions for each first signal light, and when at least a portion of the valid operation regions overlap with each other, gives priority to valid operation regions for which the priority is higher.

[Supplementary Note 5]

In the display device described in Supplementary Note 1:

the user interface unit successively detects the first signal light from captured images that are supplied from the imaging unit, sets the valid operation regions for each first signal light, and when at least a portion of the valid operation regions overlap with each other, gives priority to valid operation regions for which the order of detection of the first signal light is later or earlier.

[Supplementary Note 6]

In the display device as described in Supplementary Note 1, the indicator emits second signal light, and the light emission pattern of the second signal light differs from the light emission pattern of the first signal light.

[Supplementary Note 7]

The display device as described in any one of Supplementary Notes 1 to 6 further has a projection unit that projects an image;

wherein the display screen is a screen that is projected from the projection unit.

[Supplementary Note 8]

An electronic blackboard system has:

the display device as described in any one of Supplementary Notes 1 to 7; and a light-emitting device that emits the first signal light.

[Supplementary Note 9]

In the electronic blackboard system as described in Supplementary Note 8, the light-emitting device is a portable terminal equipped with light capability.

[Supplementary Note 10]

A light-emitting device that is used in combination with a display device that is provided with a display screen and that receives input operations that use an indicator upon the display screen includes:

an operation unit;

a light-emitting unit;

a control unit that receives input operations of a user by way of the operation unit and that controls the light-emitting operations of the light-emitting unit; and a data table that stores, for a plurality of setting items that make up profiles of valid operation regions in which input operations that use the indicator are valid, setting content and light emission patterns in association for each setting item;

wherein the control unit refers to the data table, acquires a light emission pattern that corresponds to a setting item that a user selected from among the plurality of setting items, generates a command in which the light emission pattern is combined with a predetermined light emission pattern, and causes a command signal light that is based on the command to be emitted by the light-emitting unit.

[Supplementary Note 11]

A user interface setting method that is carried out in a display device that is used in combination with a light-emitting device that emits a first signal light and that receives input operations using an indicator upon a display screen that displays a video signal that is applied as input to the display device includes:

using an image sensor to capture images of the display screen and the first signal light; and on the basis of captured images that are supplied from the image sensor, taking a region of the display screen that is within a predetermined distance range from the detected position of the first signal light as a valid operation region in which input operations using the indicator are valid.

[Supplementary Note 12]

A program that causes a computer of a display device that is used in combination with a light-emitting device that emits a first signal light to execute processes of:

receiving input operations that use an indicator upon a display screen that displays a video signal that is applied as input to the display device;

using an image sensor to capture images of the display screen and the first signal light; and on the basis of captured images that are supplied from the image sensor, taking a region of the display screen that is within a distance range that is determined in advance from the detected position of the first signal light as the valid operation region for which input operations using the indicator are valid.

[Supplementary Note 13]

A program causes a computer of a light-emitting device that is used in combination with a display device that is provided with a display screen and that receives input operation using an indicator upon the display screen to execute processes of:

for a plurality of setting items that make up profiles of valid operation regions for which input operations using the indicator are valid, referring to a data table in which setting content and light emission patterns are stored in association for each setting item and acquiring a light emission pattern that corresponds to a setting item that a user selected from among the plurality of setting items; and emitting a command signal light in which are combined the light emission pattern that was acquired and a predetermined light emission pattern.

EXPLANATION OF REFERENCE NUMBERS

6 Display device
61 User interface unit
62 Imaging unit

The invention claimed is:

1. A display device that is used in combination with a light-emitting device that emits a first signal light, comprising:

a user interface unit that receives input operations that use an indicator upon a display screen that displays a video signal that is applied as input to said display device; and an imaging unit that captures images of said display screen and said first signal light;

wherein:

said user interface unit, on the basis of captured images that are supplied from said imaging unit, takes a region of said display screen that is within a distance range that has been determined in advance from a detected position of said first signal light as a valid operation region in which input operations that use said indicator are valid;

said first signal light contains a light emission pattern that indicates profile information of said valid operation region, and said user interface unit acquires said profile information on the basis of the light emission pattern and sets this profile information to said valid operation region;

said profile information is made up from a plurality of setting items;

said display device further includes a data table that stores setting content and a light emission pattern in association for each of said setting items; and said user interface unit refers to said data table to acquire setting content that corresponds to a light emission pattern contained in said first signal light.

2. The display device as set forth in claim 1, wherein:

said plurality of setting items includes a setting item that indicates a priority of said valid operation regions; and said user interface unit successively detects said first signal light from captured images that are supplied from said imaging unit, sets said valid operation regions for each first signal light, and when at least a portion of said valid operation regions overlap with each other, gives priority to valid operation regions for which said priority is higher.

3. The display device as set forth in claim 1, wherein:

said user interface unit successively detects said first signal light from captured images that are supplied from said imaging unit, sets said valid operation regions for each of the first signal light, and when at least a portion of the valid operation regions overlap with each other, gives priority to valid operation regions for which an order of detection of said first signal light is later or earlier.

4. The display device as set forth in claim 1, wherein:

said indicator emits a second signal light, and a light emission pattern of said second signal light differs from the light emission pattern of said first signal light.

5. An electronic blackboard system comprising:

the display device as set forth in claim 1; and a light-emitting device that emits said first signal light.

6. A light-emitting device that is used in combination with a display device that is provided with a display screen and that receives input operations that use an indicator upon the display screen, said light-emitting device comprising:

an operation unit;

a light-emitting unit;

a control unit that receives input operations of a user by way of said operation unit and that controls light-emitting operations of said light-emitting unit; and a data table that stores, for a plurality of setting items that make up profiles of valid operation regions in which input operations that use said indicator are valid, setting content and light emission patterns in association for each setting item;

wherein:

said control unit refers to said data table, acquires a light emission pattern that corresponds to a setting item that a user selected from among said plurality of setting items, generates a command in which the light emission pattern is combined with a predetermined light emission pattern, and causes a command signal light that is based on the command to be emitted by said light-emitting unit.

7. A user interface setting method that is carried out in a display device that is used in combination with a light-emitting device that emits a first signal light and that receives input operations using an indicator upon a display screen that displays a video signal that is applied as input to said display device, said user interface setting method comprising:

using an image sensor to capture images of said display screen and said first signal light;

on the basis of captured images that are supplied from the image sensor, taking a region of said display screen that is within a predetermined distance range from a detected position of said first signal light as a valid operation region in which input operations using said indicator are valid, wherein said first signal light contains a light emission pattern that indicates profile information of said valid operation, region;

acquiring said profile information on the basis of the light emission pattern and setting this profile information to said valid operation region, wherein said profile information is made up from a plurality of setting items, and said display device further includes a data table that stores setting content and a light emission pattern in association for each of said setting items; and referring to said data table to acquire setting content that corresponds to a light emission pattern contained in said first signal light.

* * * * *